US009572028B2

(12) United States Patent
Kim et al.

(10) Patent No.: US 9,572,028 B2
(45) Date of Patent: Feb. 14, 2017

(54) MOBILE DEVICE, AND METHOD FOR RELEASING LOCK OF THE MOBILE DEVICE VIA HANDWRITING RECOGNITION

(71) Applicant: Samsung Electronics Co., Ltd., Gyeonggi-do (KR)

(72) Inventors: Sangho Kim, Gyeonggi-do (KR); Musik Kwon, Seoul (KR); Moorim Kim, Gyeonggi-do (KR); Seongtaek Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/787,088

(22) Filed: Mar. 6, 2013

(65) Prior Publication Data

US 2014/0038557 A1    Feb. 6, 2014

(30) Foreign Application Priority Data

Aug. 1, 2012  (KR) .................. 10-2012-0084326

(51) Int. Cl.
*H04M 3/16* (2006.01)
*H04W 12/06* (2009.01)
*G06F 21/32* (2013.01)
*G06F 21/36* (2013.01)
*G06F 3/0488* (2013.01)

(52) U.S. Cl.
CPC .......... *H04W 12/06* (2013.01); *G06F 3/04883* (2013.01); *G06F 21/32* (2013.01); *G06F 21/36* (2013.01)

(58) Field of Classification Search
CPC ......... H04W 12/00; G06F 3/048; G06F 3/033; H04M 1/66

USPC ................... 455/410, 411; 715/863
See application file for complete search history.

(56) References Cited

U.S. PATENT DOCUMENTS

| | | | |
|---|---|---|---|
| 6,745,327 B1 | 6/2004 | Messing | |
| 7,499,589 B1 * | 3/2009 | Cortopassi et al. | 382/186 |
| 7,593,000 B1 * | 9/2009 | Chin | 345/156 |
| 8,743,082 B2 * | 6/2014 | Ganapathi et al. | 345/174 |
| 2003/0233557 A1 | 12/2003 | Zimmerman | |

(Continued)

FOREIGN PATENT DOCUMENTS

| | | | |
|---|---|---|---|
| JP | 2010198076 A * | 9/2010 | G06G 7/00 |
| WO | WO 98/19292 | 5/1998 | |

OTHER PUBLICATIONS

Aitor Mendaza-Ormaza et al., "Analysis on the Resolution of the Different Signals in an On-line Handwritten Signature Verification System Applied to Portable Devices", 2010 IEEE International Carnahan Conference on Security Technology (ICCST), Oct. 5, 2010.

(Continued)

*Primary Examiner* — Amancio Gonzalez
(74) *Attorney, Agent, or Firm* — The Farrell Law Firm, P.C.

(57) ABSTRACT

A method, and a mobile device adapted thereto, verifies a user and executes applications via handwriting recognition. The method of controlling a mobile device includes entering a lock state, detecting a user's input, verifying a user based on the input and searching for an instruction corresponding to the input, and performing at least one of maintaining or releasing the lock state and which performs an operation corresponding to the instruction, based on user verification result and the instruction search result.

14 Claims, 13 Drawing Sheets

(56) References Cited

U.S. PATENT DOCUMENTS

| | | |
|---|---|---|
| 2004/0203594 A1 | 10/2004 | Kotzin et al. |
| 2007/0154071 A1 | 7/2007 | Lin et al. |
| 2007/0283431 A1* | 12/2007 | Ueda ..................... G06F 21/32 726/19 |
| 2010/0162182 A1* | 6/2010 | Oh et al. ..................... 715/863 |
| 2010/0306718 A1 | 12/2010 | Shim et al. |
| 2011/0041102 A1 | 2/2011 | Kim |
| 2011/0134028 A1* | 6/2011 | Hiroshima et al. ........... 345/156 |
| 2011/0247065 A1 | 10/2011 | Melnyk |

OTHER PUBLICATIONS

Lisa Anthony et al., "$N-Protractor: A Fast and Accurate Multistroke Recognizer", Graphics Interface 2012, May 28, 2012.
European Search Report dated Jan. 8, 2015 issued in counterpart application No. 13164314.0-1972.

\* cited by examiner

FIG. 7

| input means | shape | Average speed | Speed deviation |
|---|---|---|---|
| pen | *Call mom* | 40 pixel/ms | 11 pixel/ms |
| finger | *Call mom* | 42 pixel/ms | 5 pixel/ms |
| | | ... | ... |

FIG. 10

| input | text | application | detailed description |
|---|---|---|---|
| *email* | email | e-mail | sender, reciever, ······ |
| *browser* | browser | webbrowser | address, ······ |
| *gallery* | gallery | picture gallery | folder, file, ······ |
| *map* | map | map application | location, ······ |
| *call* | call | phone call | name, number, ······ |

MOBILE DEVICE, AND METHOD FOR RELEASING LOCK OF THE MOBILE DEVICE VIA HANDWRITING RECOGNITION

PRIORITY

This application claims priority under 35 U.S.C. §119(a) to a Korean patent application filed on Aug. 1, 2012 in the Korean Intellectual Property Office and assigned Serial No. 10-2012-0084326, the contents of which are incorporated herein by reference.

BACKGROUND OF THE INVENTION

1. Field of the Invention

The present invention relates generally to a method for verifying a mobile device user and executing applications, via handwriting recognition, and to a mobile device adapted to the method.

2. Description of the Related Art

The importance of protecting personal information in mobile devices has significantly increased in relation to the increase in the number of people who use touch screen-based mobile devices, such as smart phones. A lock mode is a conventional method of protecting personal information in mobile devices. For example, if a user needs to operate his/her mobile device, set in a conventional lock mode state, he/she must first release the lock in order to execute a corresponding application in the mobile device.

FIG. 1 illustrates a conventional method requiring a mobile device user to input a specific pattern to the mobile device in order to release the lock state. When the mobile device verifies the user's input pattern as a correct pattern as shown in the left diagram of FIG. 1, the mobile device displays an idle screen. If the user selects an application, such as a call application, as shown in the middle diagram, the mobile device executes the application and displays the corresponding screen as shown in the right diagram.

However, conventional methods inconveniently require a number of user input operations to operate a mobile device from a step for releasing the lock state to a step for executing an application. In addition, since conventional lock patterns are set by the use of nine points arranged in matrix form on the screen, the configuration results in a relatively simple combination producing a low level of security of the lock. This results in a user's dissatisfaction with the lock state of the mobile device.

SUMMARY OF THE INVENTION

The present invention has been made in view of the above problems, and provides a method that can release a lock state of a mobile device and execute corresponding functions, via handwriting recognition. The present invention further provides a mobile device adapted to the method.

In accordance with an embodiment of the present invention, provided is a method which controls a mobile device, including entering a lock state, detecting an input in the lock state, verifying a user based on the input and searching for an instruction corresponding to the input, and performing at least one of maintaining or releasing the lock state based on the verification result and which performs an operation corresponding to the instruction based on the instruction search result.

In accordance with another embodiment of the present invention, provided is a mobile device, including an input unit which detects an input, a display unit for displaying information, and a controller which controls the display unit to display a lock screen when entering a lock state, which verifies, when the input is detected via the input unit, a user based on the input and for searching for an instruction corresponding to the input at the same time, and which performs at least one of maintaining or releasing the lock state based on the verification result and which performs an operation corresponding to the instruction based on the instruction search result.

BRIEF DESCRIPTION OF THE DRAWINGS

The features and advantages of the invention will become more apparent from the following detailed description viewed in conjunction with the accompanying drawings, in which:

FIG. 7 shows an example of verification information according to an embodiment of the invention;

FIG. 10 is an instruction table according to an embodiment of the invention;

DETAILED DESCRIPTION OF EMBODIMENTS OF THE PRESENT INVENTION

Figure 1:
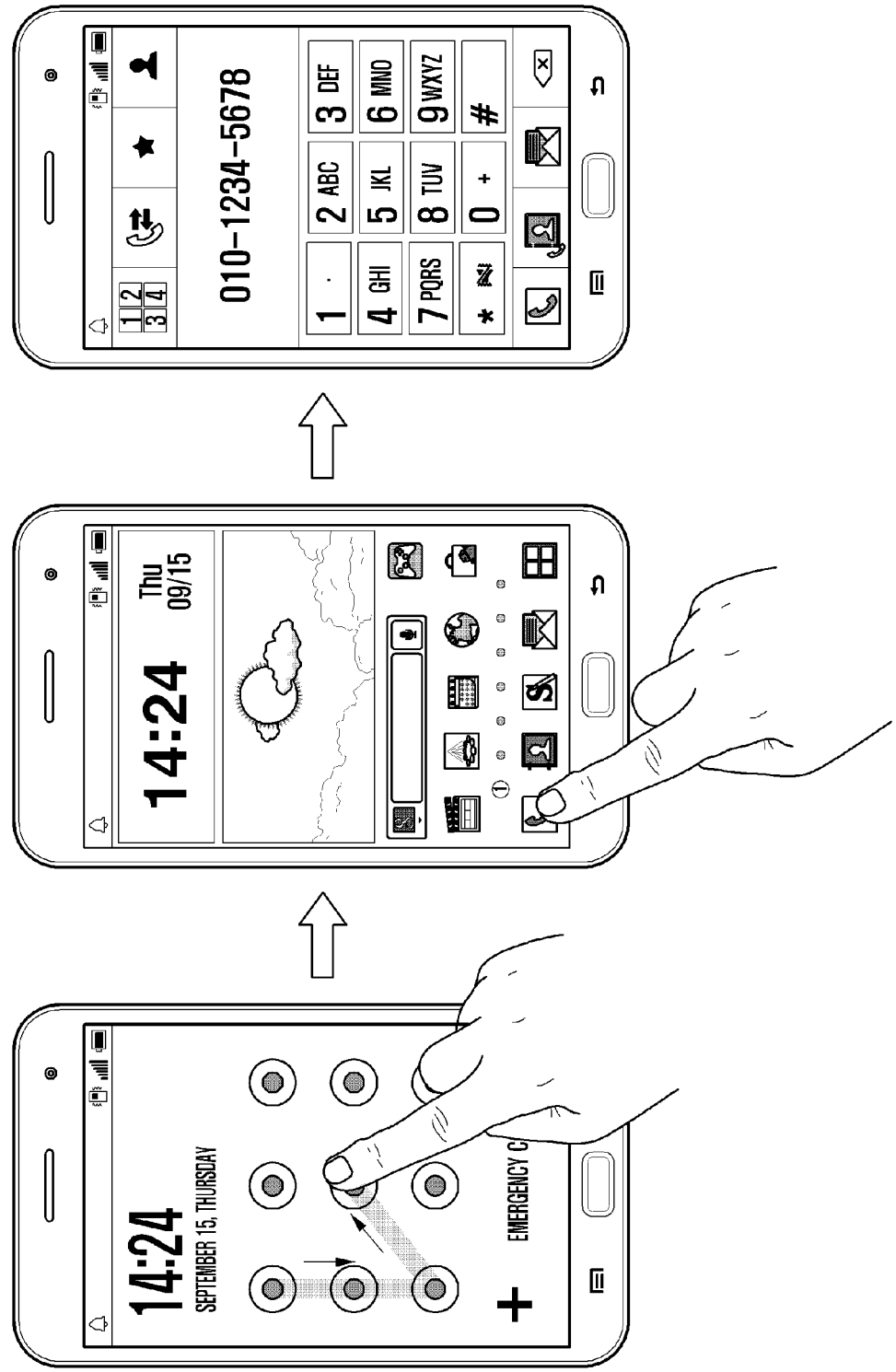
FIG. 1 illustrates a conventional method of controlling a mobile device.

Embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

The mobile device according to the invention can be applied to smart phones, portable terminals, mobile communication terminals, Personal Digital Assistants (PDAs), Portable Multimedia Players (PMPs), computers, laptop computers, note pad devices, Wibro terminals, tablet Personal Computers (PCs), smart Televisions (TVs), and smart refrigerators for example.

The terms or words described in the present description and the claims should not be limited by a general or dictionary meaning, and instead should be understood as having the meaning conveyed in the description. One skilled in the art will understand that the embodiments disclosed in the description and configurations illustrated in the drawings are only examples, and there may be various modifications, alterations, and equivalents thereof to replace the embodiments at the time of filing this application.

As used herein, the singular forms "a," "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 2:
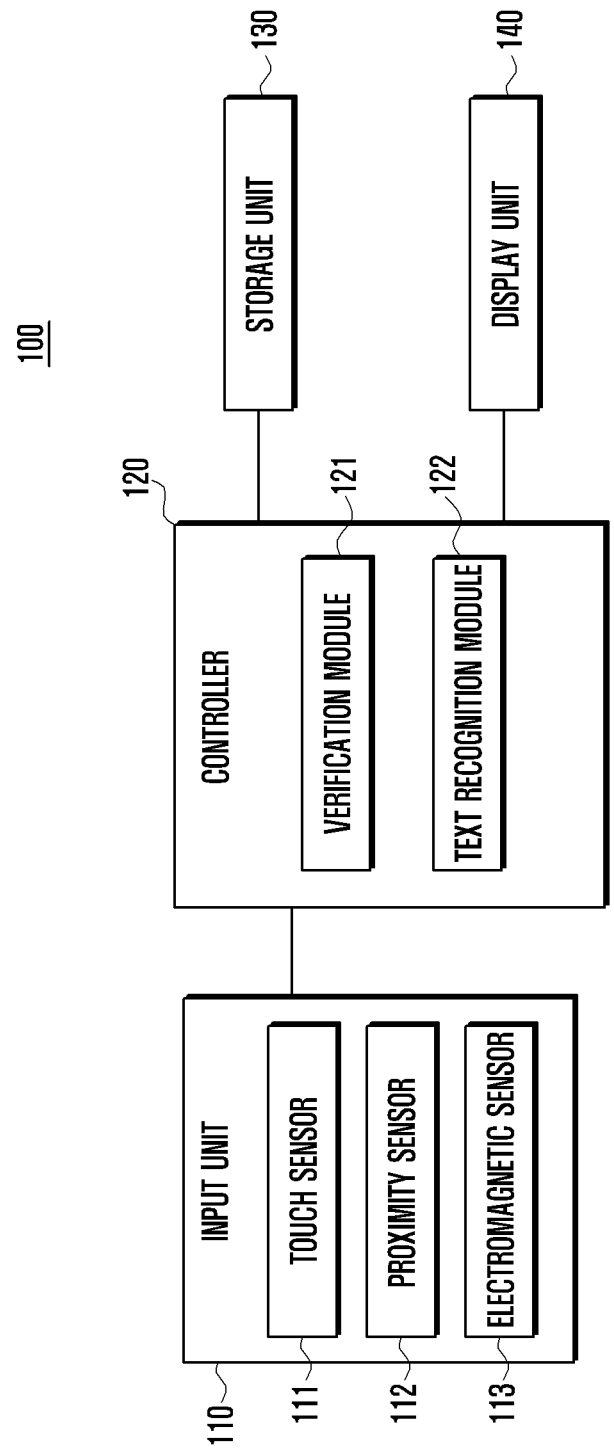
FIG. 2 illustrates a schematic block diagram of a mobile device according to an embodiment of the invention.

FIG. 2 illustrates a block diagram of a mobile device according to an embodiment of the present invention.

Referring to FIG. 2, the mobile device 100 includes an input unit 110, a controller 120, a storage unit 130 and a display unit 140.

The input unit 110 creates operation signals according to the user's inputs. The input unit 110 includes a touch sensor 111, a proximity sensor 112 and an electromagnetic sensor 113.

The touch sensor 111 detects the user's touch inputs. The touch sensor 111 may include a touch film, a touch sheet, and a touch pad, for example. The touch sensor 111 detects a touch input and transfers the detected touch signal to the controller 120. The controller 120 analyzes the touch signal and executes the corresponding function. The information corresponding to the detected touch signal may be displayed on the display unit 140. The touch sensor 111 receives operation signals created when the user inputs touches via a variety of touch means. The touch sensor 111 receives an operation signal from a user's body (such as a finger). According to the types of implementations, the touch sensor 111 detects a direct touch or a proximity input within a certain range of distance.

The proximity sensor 112 detects, for example, a presence, an approach, a motion, a direction, a speed, or a shape of a nearby object in the detection surface of the input unit 110, via the electromagnetic field intensity, without any mechanical contact. The proximity sensor 112 is, for example, a transmission photoelectric type, a direct reflective photoelectric type, a mirror photoelectric type, a high frequency oscillation type, a capacitance sensor, a magnetic type, or an infrared type.

The electromagnetic sensor 113 detects a touch or proximity input according to the change in electromagnetic field intensity. The electromagnetic sensor 113 may be an Electro Magnetic Resonance (EMR) type of input pad. The electromagnetic sensor 113 includes coils inducing magnetic fields, and detects the approach of an object including a resonant circuit that creates the change in magnetic field energy. The electromagnetic sensor 113 detects an input via an object including a resonant circuit, such as a stylus pen. The electromagnetic sensor 113 can also detect a proximity input or hovering input to the mobile device 100 as well as an input to the mobile device 100 via a direct touch.

Figure 3:
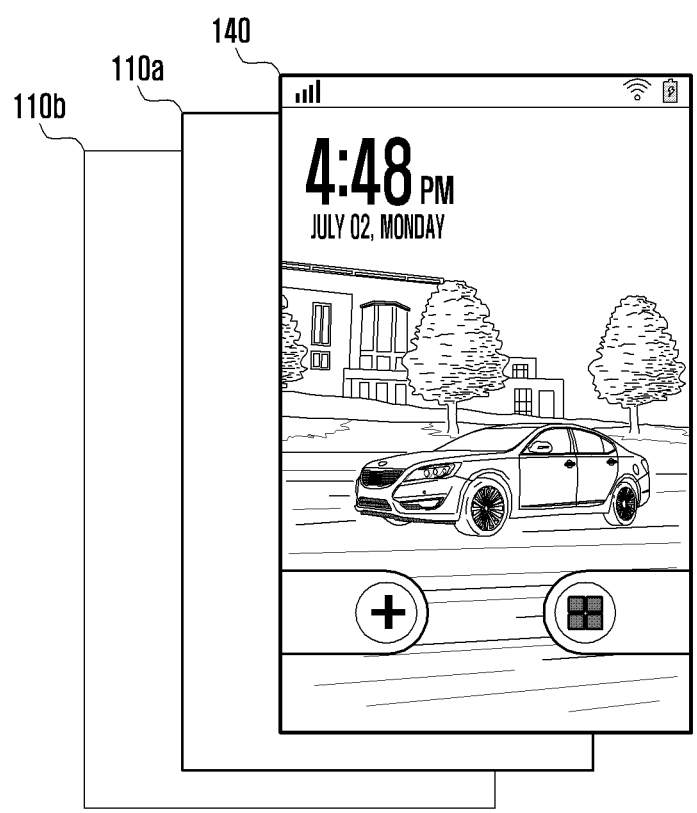
FIG. 3 illustrates a configuration of the input unit according to an embodiment of the invention.

FIG. 3 illustrates a configuration of the input unit according to an embodiment of the present invention. Referring to FIG. 3, the input unit 110 includes first 110a and second 110b input pads forming layers. The first 110a and second 110b input pads may be implemented with a pressure pad, a touch pad, including a proximity sensor 112 and a touch sensor 111, EMR pad, or an electromagnetic pad with an electromagnetic sensor 113. The first 110a and second 110b input pads may be implemented with different types of input means with which to detect the inputs. For example, the first input pad 110a, detects a touch input from a user's body when implemented with a touch pad. Likewise, if the second input pad 110b detects an input by a stylus pen when implemented with an EMR pad.

The input unit 110 is configured to form a layer with the display unit 140. The first input pad 110a and second 110b input pad are placed under the display unit 140, and detect inputs created, via icons, menus, buttons. displayed on the display unit 140, which is a display panel or a Touch Screen Panel (TSP) combined with an input pad. The controller 120 can identify the type of input means according to whether the input signal is detected via the first 110a or second 110b input pad.

The configuration combining the input unit 110 with the display unit 140, as shown in FIG. 3, is an example. Therefore, it should be understood that there are many modifications according to the number and type of input pads of the input unit 110 and the arrangement of the display unit 140 and the input pad forming upper and lower layers, according to technology employed in the mobile device 100.

The input unit 110 detects a user's inputs for entering a lock state or a lock state release. The input unit 110 detects a user's inputs for storing information to control functions of the mobile device 100 or the lock state release. For example, the input unit 110 detects a user's inputs for registering user verification information, and inputs for instructions, signature or text used for user verification.

The controller 120 controls respective components in the mobile device 100, thereby controlling the entire operation of the mobile device 100. For example, the controller 120 determines whether the lock state of the mobile device 100 is released based on input detected via the input unit 110, and whether to operate an application.

The controller 120 includes a verification module 121 and a character recognition module 122.

The verification module 121 performs a user verification procedure by extracting an input feature from the detected input and comparing the extracted input feature with that of previously stored user verification information. The verification module 121 performs a comparison process as to the identity/similarity/difference between the input properties, by using a variety of algorithms, such as a character stream comparison algorithm, including Brute Force, Knuth-Morris-Pratt, Boyer-Moore, Shift-Or, or an image comparison algorithm such as a neural network algorithm or a bitmap algorithm.

The verification module 121 determines whether the verification is successful according to the comparison result. The verification module 121 calculates the degree of similarity based on the comparison result. If the degree of similarity is greater than or equal to a preset threshold, the verification module 121 concludes that the verification is successful. If the degree of similarity is less than the preset threshold, the verification module 121 concludes that the verification is unsuccessful.

The character recognition module 122 extracts one or more characters such as letters, numbers, special characters, symbols, and space, from an input. The character recognition module 122 can recognize and extract one or more characters by using pattern matching or structure analysis, for example.

The controller 120 performs a user verification procedure via the verification module 121, for an input detected in the lock state. In addition, the controller 120 can recognize text having the one or more characters extracted by the character recognition module 122, and search for instructions corresponding to the recognized text.

The controller 120 maintains or releases a lock state of the mobile device 100 according to the user verification result or executes a function according to the instruction search result.

The storage unit 130 stores programs or instructions related to the operations of the mobile device 100. The controller 120 executes the programs or processes the instructions.

The storage unit 130 may be implemented with various types of storage media, such as flash memory, hard disk, multimedia card micro memory, memory card, Random Access Memory (RAM), Static Random Access Memory (SRAM), Read-Only Memory (ROM), Electrically Erase Programmable Read-Only Memory (EEPROM), Programmable Read-Only Memory (PROM), magnetic memory, magnetic disk, or optical disk.

In an embodiment of the invention, the storage unit 130 stores user verification information with an input feature and information regarding a type of input means, as well as information regarding operations corresponding to instructions in an instruction table.

The display unit 140 displays information, processed in the mobile device 100. For example, the display unit 140 may display User Interface (UI) or Graphic User Interface (GUI) related to the control of functions of the mobile device 100.

The display unit 140 may be implemented with a flat display panel, such as a Liquid Crystal Display (LCD), a Thin Film Transistor-Liquid Crystal Display (TFT LCD), Organic Light Emitting Diodes (OLEDs), a flexible display, or a three-dimensional (3D) display.

The display unit 140 may be configured with a touch screen and touch sensors serving as the input unit 110, where the touch screen and touch sensors form layers. The display unit 140 may be implemented with a display panel combined with touch sensors, such as TSP. That is, the display unit 140 serving as a touch screen may also serve to perform functions of an input device.

In an embodiment of the invention, the display unit 140 can display a user's input gesture. The display unit 140 can also display a lock state screen, an idle screen or an application execution screen, under the control of the controller 120.

It should be understood that the mobile device 100 may be modified to remove part of the components shown in FIG. 2 or may further include other components (not shown), showing the features of the invention.

Figure 4:
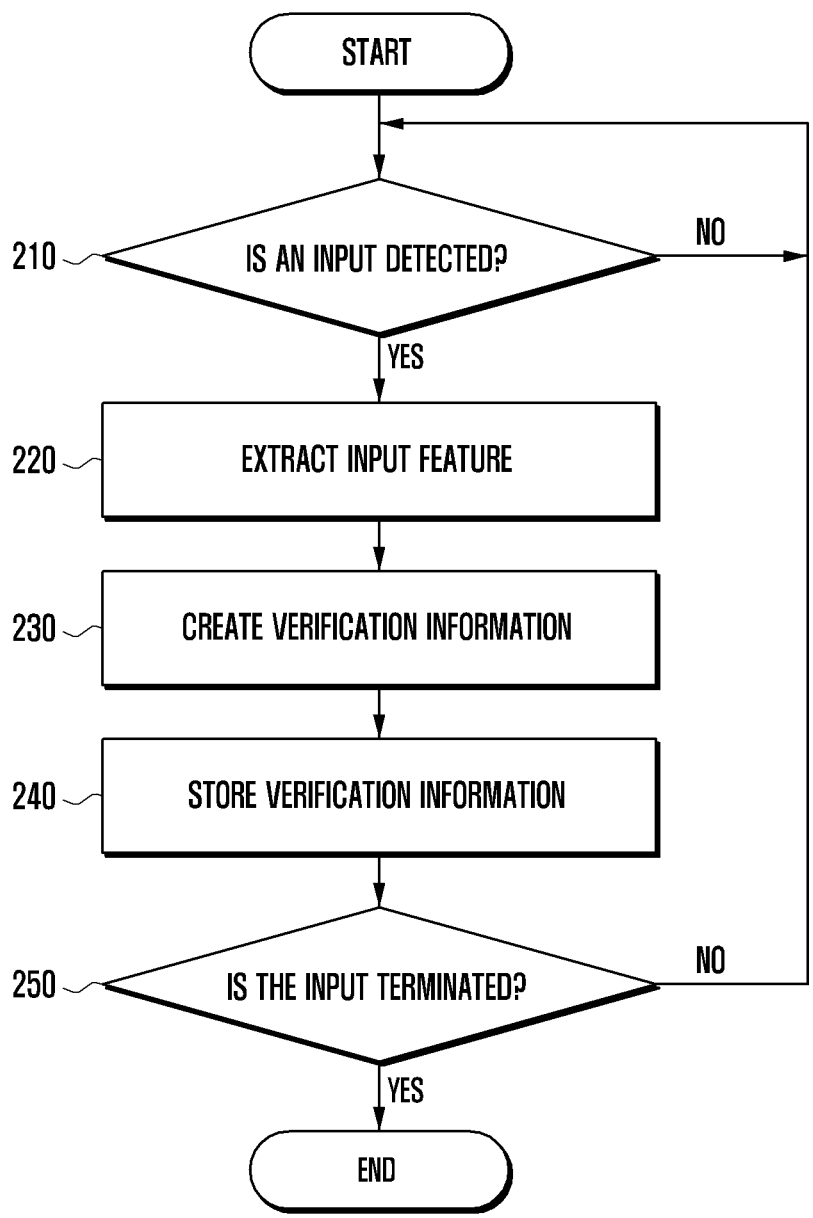
FIG. 4 illustrates a method for registering user verification information according to an embodiment of the invention.

FIG. 4 illustrates a method for registering user verification information according to an embodiment of the present invention.

The mobile device 100 detects an input at step 210.

For example, the mobile device 100 detects an input for registering user verification information while executing the application for registering user verification information, a setting program, or a service program. User verification information serves to determine, when the mobile device 100 operates in a lock state, whether a user, who has applied an input for releasing the lock state to the mobile device 100, is a valid user. User verification information is created via valid user inputs and registered in the mobile device 100.

The input for registering user verification information may be implemented with an operation/motion forming/drawing a certain shape, such as a letter, a number, or a special symbol. The input may be a word to identify a user, such as a name ('Brown,' 'John,' etc.), sex, or a nickname. The input may also be a word representing an application, program, or service, such as 'call,' 'memo,' or 'map,'.

The input for registering user verification information may be input to the mobile device 100 via a specific input means, such as a user's finger or a stylus pen. The types of inputs may be a touch input and a proximity input.

Figure 5:
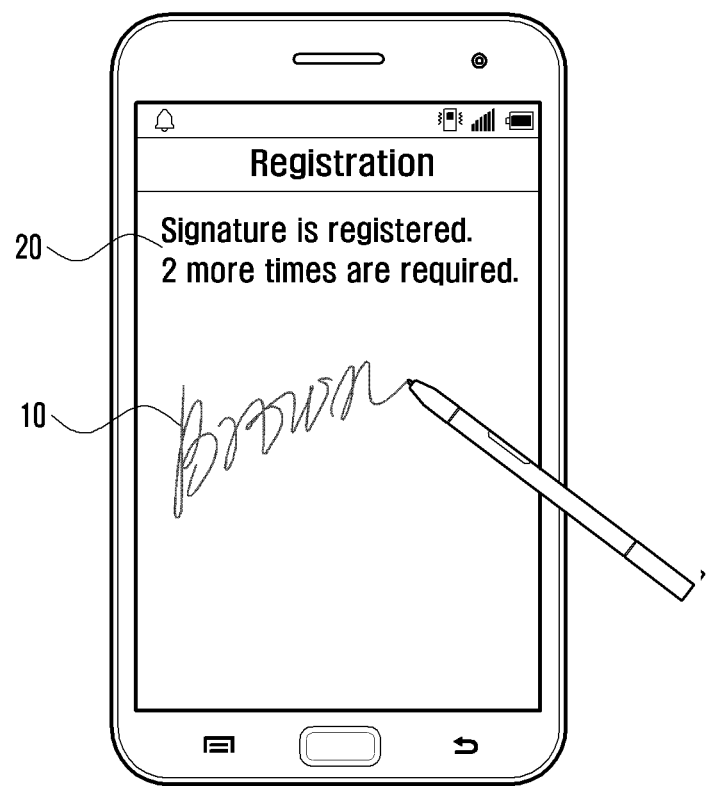
FIG. 5 illustrates a text for verification input to an input unit according to an embodiment of the invention.
Figure 6:
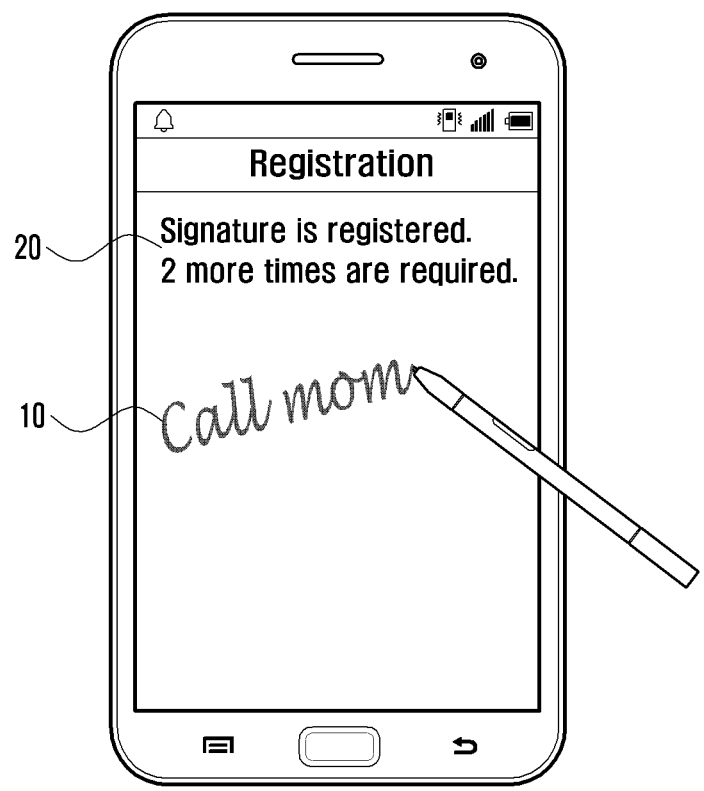
FIG. 6 illustrates another text for verification input to an input unit according to an embodiment of the invention.

As shown in FIG. 5, the mobile device 100 detects an input 10 for registering user verification information. The input 10 may be a touch input by a stylus pen or a word corresponding to the mobile device user's name 'Brown.' Alternatively, as shown in FIG. 6, the mobile device 100 detects an input representing a call application 'call Mom.'

Returning to FIG. 4, when detecting an input at step 210, the mobile device 100 extracts an input feature at step 220, which includes at least one of an input means, a shape of an inputting gesture, and a speed of an inputting gesture, for example.

The mobile device 100 can identify an input means, such as a user's finger, hand, or a stylus pen, according to a detected input. Alternatively, the mobile device 100 may include a number of sensors to detect various types of input means. In that case, the mobile device 100 can identify an input means via the corresponding sensor that detects the input. The mobile device 100 may include a number of sensors configured in a pad, such as a touch pad, an EMR pad or a TSP.

The mobile device 100 detects types of input means based on areas to which the input means is applied. For example, if the mobile device 100 ascertains that a detected area to which an input means is applied is greater than a threshold value, the mobile device 100 identifies the input means as a user's finger. If a detected area to which an input means is applied is less than or equal to a threshold value, the mobile device 100 identifies the input means as a stylus pen.

The mobile device 100 may extract two- or three-dimensional coordinates of a detected input during a preset period. The mobile device 100 can extract the coordinates, on a basis of a point where an input started, as the original point. Since the mobile device 100 extracts coordinates of inputs, on the basis of a relative point where an input started, and not an absolute point, the mobile device 100 can extract a shape of an input operation, irrespective of the location/point where the input is detected.

The mobile device 100 can calculate a movement distance (based on a measurement of pixels, mm, or cm.) of an input operation input during a preset period, based on the extracted coordinates, and then compute the speed of the input operation according to the period. The mobile device 100 can compute the average speed or the speed deviation for the entire input operation.

After extracting the input feature at step 220, the mobile device 100 creates user verification information at step 230 based on the extracted input feature. As shown in FIG. 7, user verification information may include an input feature, such as input means, input shape, average speed, and speed deviation.

The input shape corresponds to data representing an image created when an input operation forms a track or data to be shown as coordinates extracted according to a preset period from an input. The coordinates extracted from an input may refer to coordinates of a location relative to a point where the input started, not an absolute point where the input is made. Therefore, the coordinates of an input may represent a shape formed by an input, on the basis of a point where the input starts, irrespective of an absolute point where the input is made.

The average speed refers to a value that is calculated via the coordinates extracted from the inputs. Speed according to periods can be calculated via a distance between coordinates extracted at a certain period. An average speed can be calculated by averaging speeds according to periods. The speed deviation refers to respective periods, based on the average speed.

As shown in FIG. 5, the mobile device 100 can extract an input feature, on the basis of the coordinates extracted from an input 10, 'Brown.' The mobile device 100 can calculate speeds according to periods, by detecting the number of pixels between coordinates extracted during every preset period, 1 ms.

The mobile device 100 averages speeds according to periods, and calculates the average speed for inputs by a stylus pen as shown in FIG. 7, thereby creating user verification information including the calculation result of 40 pixels/ms. Alternatively, as shown in FIG. 5, the mobile device 100 can extract the input 10, 'Brown,' as image data, thereby creating user verification information including the extracted image data. In that case, the mobile device 100 may create user verification information by extracting coordinates from the input 10, 'Brown,' every 1 ms.

Returning to FIG. 4, after creating user verification information at step 230, the mobile device 100 stores the user verification information in the storage unit 130 at step 240.

The user verification information may include the extracted input feature.

The mobile device 100 may also store a threshold value and a weight in order to determine the similarity with respect to user verification information.

The weight refers to an index to set the degree of sensitivity of the input feature, large or small, when the mobile device 100 determines the similarity between the stored user verification information and a user's input in order to release a lock state of the mobile device 100. That is, the weight may be a ratio of respective input features to the total similarity. The weight may be set as a value to minimize the Equal Error Rate (EER) performance in an input detection experiment. Alternatively, the weight may be set as values according to types of input means, respectively.

The threshold value refers to a minimum value of the similarity to verify a mobile device user's identity. That is, the threshold value is a minimum value of the similarity to conclude that a user's input to release a lock state of the mobile device 100 is identical to, or similar to, the stored user verification information. The threshold value may be set with different values, according to types of input means, based on weights acquired via the input detection experiments.

The mobile device 100 determines a weight and a threshold value corresponding to an input means, and stores them associated therewith.

The mobile device 100 extracts characters from a user's input and stores instructions corresponding to the extracted characters and an operation corresponding to the instructions.

The mobile device 100 can extract letters, numbers, special characters, symbols, and space from the input. The mobile device 100 can extract the characters via pattern matching or structure analysis, for example. The mobile device 100 can extract part or all of the characters that the user input.

The mobile device 100 can recognize texts from the extracted part or all of the characters, and can create instructions corresponding to the recognized text. Examples of the instructions are related to a calling function, an emailing function, a messaging function, a note function, a map function, and a function for opening photograph/video files.

For example, as shown in FIG. 6, the mobile device 100 may extract the characters 'c', 'a', 'l', 'l', ' ', 'M', 'o', 'm', and recognize the text 'call Mom'. The mobile device 100 may create an instruction for placing a call corresponding to the text 'call' or 'call Mom'.

The mobile device 100 can set an operation, associated with the created instruction. For example, the mobile device 100 can store the created instruction 'call Mom,' associated with an operation for placing a call to the phone number that is stored with the title 'Mom' in the contact list. Alternatively, the mobile device 100 can store the created instruction 'call,' associated with an operation for placing a call to a phone number corresponding to a text extracted before or after 'call.'

The information, created by an instruction and an operation associated therewith, is referred to as an instruction table, and will be described in detail later referring to FIG. 10.

The mobile device 100 receives user input corresponding to an application, a program, a service or a function, and executes the corresponding operation. To this end, the mobile device 100 detects the user's inputs and stores the letters extracted from the inputs, associated with the corresponding operations.

After storing user verification information at step 240, the mobile device 100 determines whether the input termination is made at step 250.

The determination whether the input termination has been made is based on whether the number of times of detecting input for registering user verification information matches a preset number.

Although the user may create the same input as the stored user verification information, input features of user inputs may differ from each other each time that they are input. Therefore, the mobile device 100 detects inputs to register user verification information by a preset number of times, and extends the range of identity/similarity for a user's input. In addition, the mobile device 100 extracts input features for a preset number of inputs, respectively, and then the deviation for the respective input features, based on the extracted input features. For example, the mobile device 100 can extract the deviation of a number of speeds extracted from the corresponding input numbers, respectively.

When the number of times of detecting input for registering user verification information matches a preset number, the mobile device 100 concludes that the input is terminated. Alternatively, if the user inputs a request for terminating the registration, the mobile device 100 concludes that the input is terminated. If the mobile device 100 detects inputs corresponding to a preset number of input operations, the mobile device 100 displays the remaining number of times, such as '2 more times are required,' labeled by reference number 20 as shown in FIG. 5.

If the mobile device 100 detects inputs by a preset number of input operations, the mobile device 100 can compare the input features of the inputs with each other. If the mobile device 100 ascertains that there is a relatively large difference between the input features of the inputs, the mobile device 100 can display a message showing that the input is unsuccessful. For example, if the user inputs 'Brown,' at the first input operation and then 'John,' at the second input operation, the mobile device 100 ascertains that 'Brown' and 'John' differ from each other in terms of input feature and thus cannot create the user verification information. In that case, the mobile device 100 informs the user that the input is unsuccessful and waits for a user's input.

If the mobile device 100 ascertains that the input termination is not made at step 250, the mobile device 100 returns to and detects a user's input at step 210.

Figure 8:
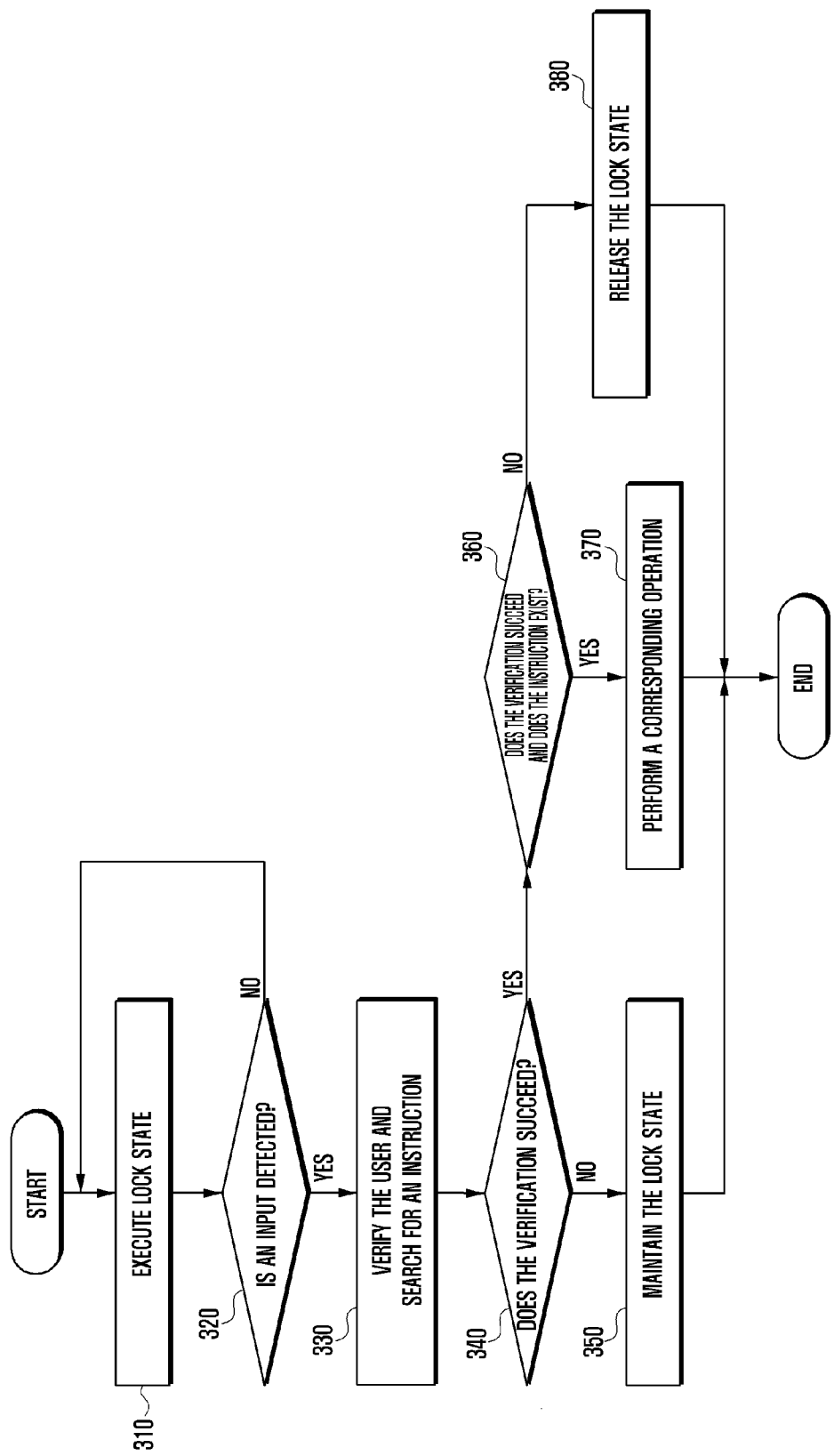
FIG. 8 illustrates a method of controlling a mobile device according to an embodiment of the invention.

FIG. 8 illustrates a method of controlling a mobile device according to an embodiment of the present invention. Referring to FIG. 8, the mobile device 100 enters a lock state at step 310.

Particularly, the mobile device 100 enters a lock state, operating in a lock mode, thereby locking a function for opening information regarding a memo to set a lock, an image, a video, a contact, and a schedule, and a function for purchasing paid information, an application, or contents. When the mobile device 100 enters a lock state a lock screen is displayed.

After entering a lock state at step 310, the mobile device 100 detects an input by an input operation at step 320.

The input may be implemented with an operation/motion forming a shape, such as a letter, a number, or a special symbol. For example, the input may be a word to identify a user, such as a name ('Brown,' 'John,' etc.), sex, or a nickname. The input may also be a word representing an application, program or service, such as 'call,' 'memo,' and 'map,'.

The input may be created via a specific input means, such as a user's finger, hand, and a stylus pen. The types of inputs may be a touch input or a proximity input.

For example, the mobile device 100 detects an input 10 by a stylus pen, 'Brown,' as shown in FIG. 5, or 'call Mom,' as shown in FIG. 6, in a lock state.

When detecting the input at step 320, the mobile device 100 performs a user verification procedure and searches for an instruction corresponding to the input at step 330. The user verification procedure and the instruction search procedure may be simultaneously performed according to the scheduling process of the mobile device 100.

Figure 9:
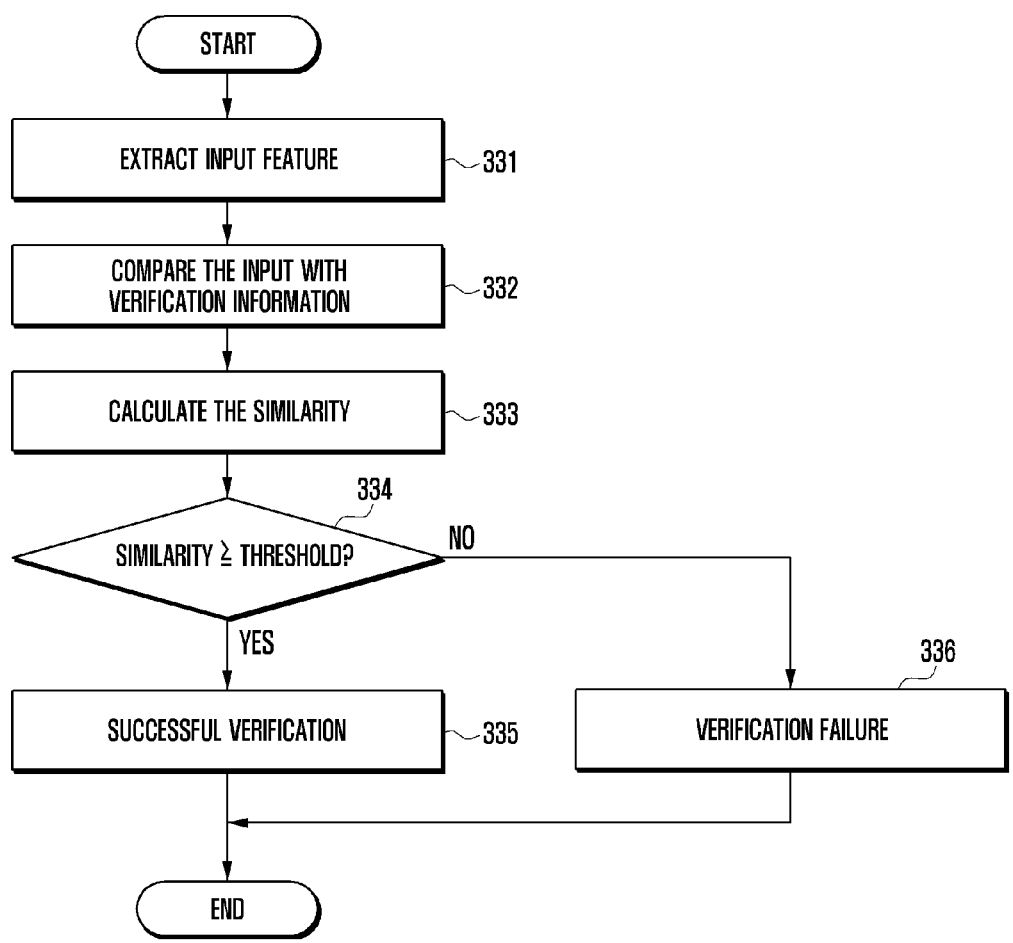
FIG. 9 illustrates a method of verifying a user of a mobile device according to an embodiment of the invention.

When detecting the input at step 320, the mobile device 100 performs a user verification procedure, which is described in detail referring to FIG. 9.

The mobile device 100 extracts the input feature at step 331, which includes at least one of a type of input means, a shape of an inputting gesture, and a speed of an inputting gesture, for example.

The mobile device 100 identifies an input means, such as a user's finger or a stylus pen, according to a detected input. Alternatively, the mobile device 100 may include a number of sensors to detect various types of input means. In that case, the mobile device 100 can identify an input means via the corresponding sensor that detects the input. The mobile device 100 may include a number of sensors configured in a pad, such as a touch pad, an EMR pad, and a TSP.

The mobile device 100 detects types of input means based on areas to which the input means is applied. For example, if the mobile device 100 ascertains that a detected area to which an input means is applied is greater than a threshold value, the mobile device 100 identifies the input means as a user's finger. If a detected area to which an input means is applied is less than or equal to a threshold value, the mobile device 100 identifies the input means as a stylus pen.

The mobile device 100 may extract two- or three-dimensional coordinates of a detected input during a preset period. The mobile device 100 can extract the coordinates, on a basis of a point where an input started, as the original point. Since the mobile device 100 extracts coordinates of inputs, on the basis of a relative point where an input started, and not an absolute point, the mobile device 100 can extract a shape of an input operation, irrespective of the location/point where the input is detected.

The mobile device 100 can calculate a movement distance (based on a measurement of pixels, mm, or cm, for example.) of an input operation input during a preset period, based on the extracted coordinates, and then compute the speed of the input operation according to the period. The mobile device 100 can compute the average speed or the speed deviation for the entire input operation.

The mobile device 100 then compares the extracted input feature with the user verification information at step 332.

The user verification information may be previously stored in the mobile device 100 when it is manufactured or may be stored via the user verification information storing method according to the present invention.

The mobile device 100 performs a comparison process as to the identity/similarity/difference between the input properties, by using a variety of algorithms, such as a character stream comparison algorithm, such as Brute Force, Knuth-Morris-Pratt, Boyer-Moore, Shift-Or, or an image comparison algorithm such as a neural network algorithm, or a bitmap algorithm.

The mobile device 100 performs the comparison between the input features extracted from the inputs of the input means. The mobile device 100 can compare the extracted input feature with one of the input features of user verification information, corresponding to the input means.

The mobile device 100 computes the similarity at step 333.

The mobile device 100 can convert the similarity between the detected input and the stored, user verification information into numerals, based on the comparison result of the input features. The mobile device 100 calculates the similarities according to the input features and sums the similarities, thereby acquiring the total similarity.

The mobile device 100 can set weights of the similarities according to the input features. The weight refers to an index to set the degree of sensitivity of the input feature, large or small, when the mobile device 100 determines the similarity between the stored, user verification information and a user's input in order to release a lock state of the mobile device 100. That is, the weight may be a ratio of respective input features to the total similarity. The weight may be set as a value to minimize the EER performance in an input detection experiment. Alternatively, the weight may be set as values according to types of input means, respectively.

The mobile device 100 can calculate the total similarity, based on the similarities according to input features and the weights corresponding to input means. For example, if the number of input features is n, the mobile device 100 can calculate the total similarity, based on the similarities according to input features, Similarity$_1$, Similarity$_2$, . . . , Similarity$_n$, and the weights for the input features, $f_1$, $f_2$, . . . , $f_n$. The total similarity is expressed as in the following Equation (1).

$$\text{Total similarity} = f_1 \times (\text{Similarity}_1) + f_2 \times (\text{Similarity}_2) + \ldots f_n \times (\text{Similarity}_n) \tag{1}$$

The mobile device 100 determines whether the total similarity is greater than or equal to a threshold value at step 334.

The threshold value refers to a minimum value of the similarity to verify a mobile device user's identity. That is, the threshold value is a minimum value of the similarity to conclude that a user's input to release a lock state of the mobile device 100 is identical to or similar to the stored, user verification information. The threshold value may be set with different values, according to types of input means, based on weights acquired via the input detection experiments.

If the mobile device 100 ascertains that total similarity is greater than or equal to a threshold value at step 334, the mobile device 100 concludes that the verification is successful at step 335.

If the mobile device 100 ascertains that total similarity is less than the threshold value at step 334, the mobile device 100 concludes that the verification is unsuccessful at step 336.

Referring back to the procedure as shown in FIG. 8, when the mobile device 100 detects the input at step 320, the mobile device 100 also searches for an instruction corresponding to the input.

The mobile device 100 can extract characters from the input, such as letters, numbers, special characters, symbols, or space. The mobile device 100 can recognize and extract characters by using pattern matching and structure analysis, for example. The mobile device 100 can extract part or all of the characters from the input, and can recognize texts including the extracted characters.

The mobile device 100 can search for an instruction corresponding to part or all of the extracted characters, and can store instructions in an instruction table as shown in FIG. 10. The instruction table includes a number of fields, inputs, texts extracted from an input, applications, programs or services corresponding to a text, and detailed description.

The input field includes an input that refers to information created by capturing a detected input or information regarding coordinates extracted from an input. The input may be information regarding a shape of a detected input, and may refer to a specific function of the mobile device 100, such as a track of an 'email,' 'browser,' 'gallery,' 'map,' or 'call,' shape.

The text field includes texts having part or all of extracted characters from an input. The text may be an instruction for executing an operation corresponding to a specific function. Examples of the text extracted from an input are 'email,' 'browser,' 'gallery,' 'map,' and 'call,'.

The field of application, program or service corresponding to a text includes applications, programs or services corresponding to a text extracted from an input, i.e., an instruction. An example of the application, program or service corresponding to a text is information regarding a name of an application for executing a web browser corresponding to an instruction 'browser,' a location of the executed file, and a download path.

The field of detailed description includes information for executing an operation corresponding to an instruction, and a method for acquiring corresponding information. Examples of the detailed description may be information for transmitting an email corresponding to an instruction 'email,' such as information regarding a sender and a receiver, and information regarding a method for acquiring information regarding a sender and a receiver, based on an extracted text and the instruction.

The detailed description may also be a Uniform Resource Locator (URL) of a website, required when a web browser application is executed by an instruction 'browser', and information regarding a method for acquiring the URL, based on the extracted text and instruction.

The instruction table may be created via a user's inputs, such that instructions are associated with applications, programs, or services.

The mobile device 100 searches for an instruction corresponding to recognized text having the extracted characters from the instruction table. The mobile device 100 may search for an instruction identical/similar to part or all of the text.

The mobile device 100 can acquire information regarding an operation corresponding to an instruction from the instruction table.

The mobile device 100 can acquire information regarding an application in the application field or information regarding an operation corresponding to an instruction in the detailed description field from the instruction table.

The mobile device 100 maintains or releases the lock state according to a result of a user's verification or executes an operation corresponding to an instruction according to the instruction search result.

Referring back to FIG. 8, the mobile device 100 determines whether user verification is successful according to user verification procedure at step 340.

Figure 11:
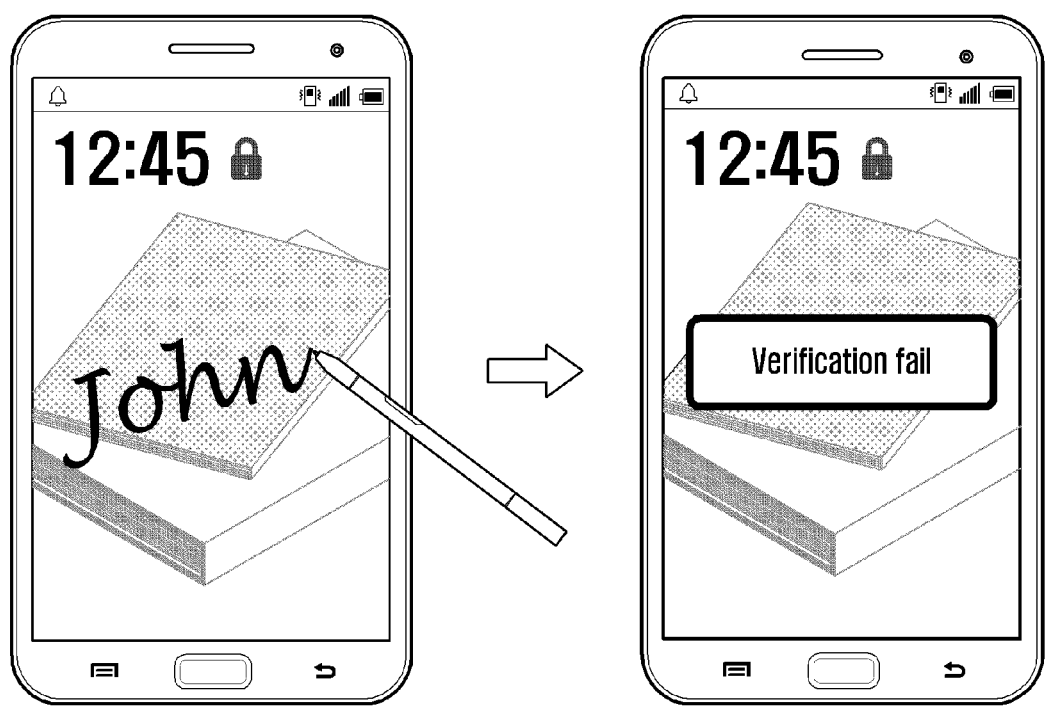
FIG. 11 illustrates an example where the lock state of a mobile device is maintained.

If the mobile device 100 ascertains that user verification is unsuccessful at step 340, the lock state is maintained at step 350. In addition, as shown in FIG. 11, the mobile device 100 may output a text, an image, an icon, a haptic effect, or a sound effect, indicating that the verification is unsuccessful. In that case, the mobile device 100 may re-detect an input for a user verification procedure at step 310. Since user verification is unsuccessful, the mobile device 100 does not allow the user to execute any control operation for a preset period of time or to apply a new input operation thereto. Alternatively, if the mobile device 100 detects that the number of verification attempts exceeds a present value, the user is not allowed to execute any control operation for a preset period of time or to apply a new input operation thereto.

If the mobile device 100 ascertains that user verification is successful at step 340, the lock state is released. In that case, the mobile device 100 executes an operation corresponding to an instruction or displays an idle screen or a screen of the currently executed application. The instruction is related to the execution of a function such as a calling, an emailing, a messaging, or a note function, an executing of an application related to a map, or an opening of photograph/video files.

As such, if the mobile device 100 ascertains that user verification is successful at step 340, the mobile device 100 determines whether an instruction corresponding to an input exists according to the instruction search procedure at step 360.

Figure 12:
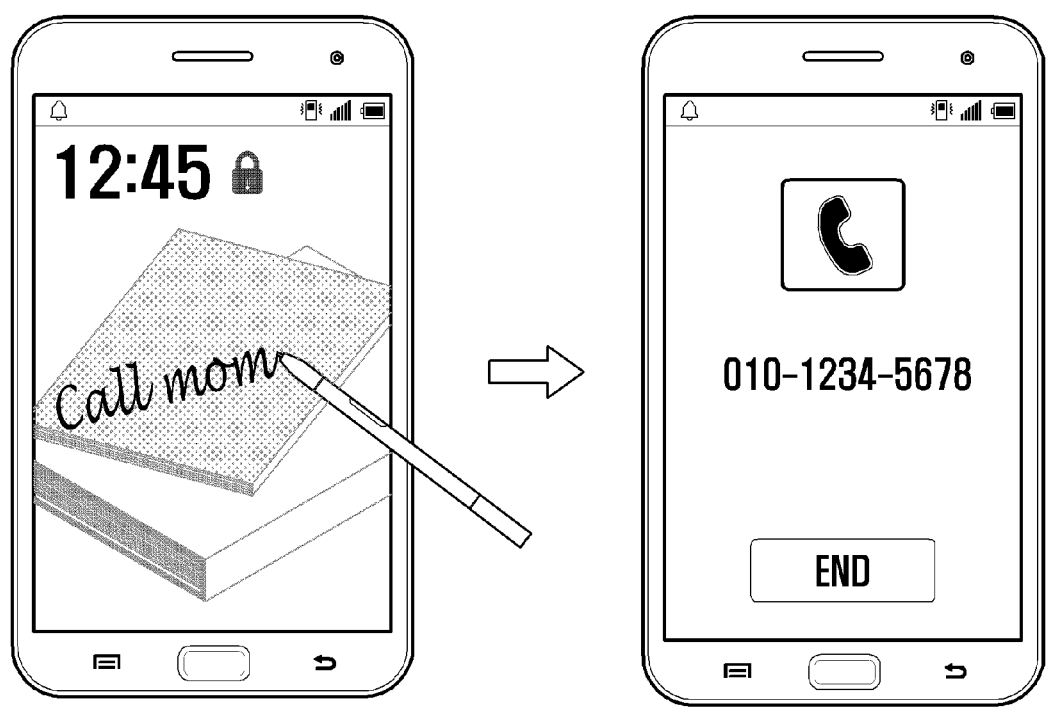
FIG. 12 illustrates an example where the lock state of a mobile device is released and the mobile device executes an application.

If the mobile device 100 ascertains that an instruction corresponding to an input exists at step 360, the mobile device 100 acquires information regarding an operation corresponding to the instruction and executes the operation at step 370. The instruction is related to the operation for an application, a program, or a service. For example, as shown in FIG. 12, the mobile device 100 places a call to the phone number corresponding to a title 'Mom' in the contact list, according to the 'call Mom' instruction. Alternatively, the mobile device 100 places a call to the phone number corresponding to a text extracted with 'call' in the contact list, according to the 'call' instruction.

If the mobile device 100 does not include an application, a program, or a service corresponding to the instruction, an installation file based on the acquired information may be downloaded. After installing the downloaded files, the mobile device 100 executes the application and/or the program, or provides the service.

Figure 13:
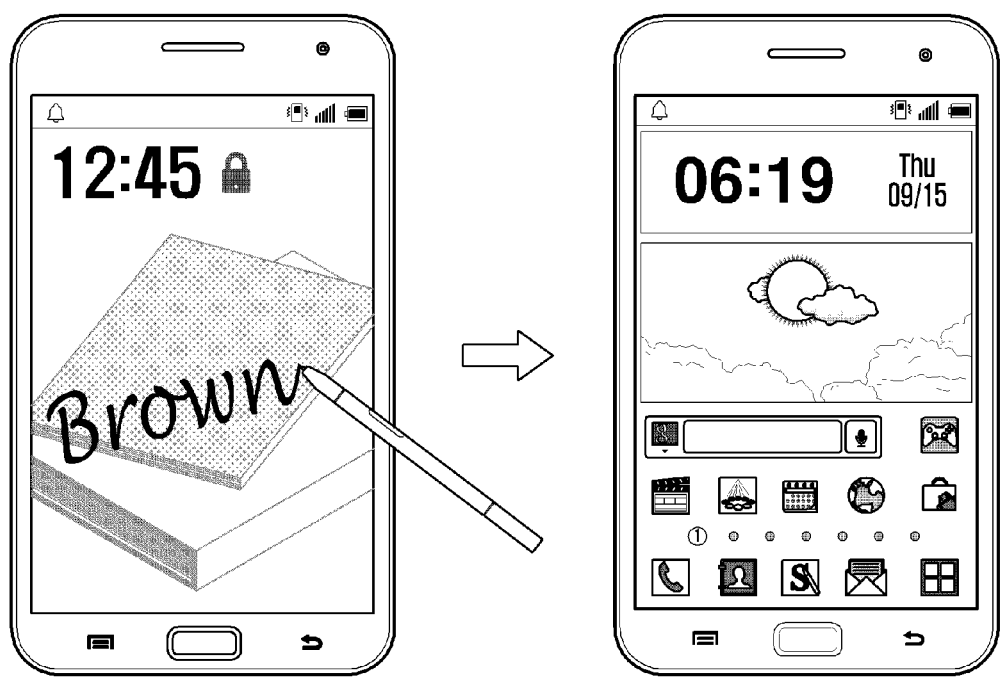
FIG. 13 illustrates an example where the lock state of a mobile device is released and an idle screen is displayed.

If the mobile device 100 ascertains that an instruction corresponding to an input does not exist at step 360, the lock state is released at step 380. In that case, the mobile device 100 displays an idle screen or a screen of the currently executed application. For example, as shown in FIG. 13, the mobile device 100 may display an idle screen that shows widgets, icons, short-cut keys, or state information, on a background image.

As described above, the method according to the present invention can recognize a user's handwriting, input to a mobile device in a lock state and release the lock state of the mobile device, so that the user can intuitively and easily execute functions by corresponding instructions.

Since the method according to the present invention determines whether to release a lock sate of a mobile device via the user's input text, the level of security in the mobile device is significantly increased, allowing the user to easily and more confidently control the functions of the mobile device.

Although embodiments of the present invention have been described in detail hereinabove, it should be understood that many variations and modifications of the basic inventive concept herein described, which may be apparent to those skilled in the art, will still fall within the spirit and scope of the embodiments of the present invention as defined in the appended claims.

What is claimed is:

1. A method of controlling a mobile device comprising:
   entering a lock state;
   detecting a handwriting input for verifying a user;
   extracting an input feature of the detected handwriting input;
   verifying, by a first application, the user based on the detected handwriting input; and
   performing one or more processes for one of maintaining and releasing the lock state while simultaneously performing a second application corresponding to an instruction included in the detected handwriting input which is used for verifying the user,
   wherein the input feature comprises at least one of an input means, a shape of the detected handwriting input and a speed of the detected handwriting input,
   wherein verifying, by the first application, the user comprises:
   comparing the input feature with a pre-stored user verification information input feature; and
   determining whether the user verification is successful based on a result of the comparison result,
   wherein performing the second application comprises:
   extracting a character from the detected handwriting input;
   searching for the instruction corresponding to the extracted character; and
   acquiring information regarding the second application corresponding to the instruction.

2. The method of claim 1, further comprising:
   detecting a handwriting input for registering user verification information;
   extracting an input feature of the detected handwriting input for registering the user verification information;
   creating the user verification information including the input feature; and
   storing the created user verification information.

3. The method of claim 1, wherein determining whether the user verification is successful comprises:
   calculating a similarity between the input feature of the detected handwriting input and the pre-stored user verification information input feature based on a result of the comparison; and
   concluding that the user verification is successful when the similarity is greater than or equal to a threshold value or that the user verification is unsuccessful when the similarity is less than the threshold value.

4. The method of claim 3, wherein the threshold value is set according to a type of input means, including at least one of a user's hand or finger, and a stylus pen, that caused the input.

5. The method of claim 1, wherein verifying, by the first application, the user comprises:
   maintaining a lock state when the user verification fails; and
   releasing the lock state when the user verification is successful.

6. The method of claim 1, wherein performing the second application comprises:
   releasing a lock state when user verification is successful.

7. The method of claim 1, further comprising:
   releasing a lock state when the user verification is successful; and
   displaying an idle screen or a screen of a currently executed second application when the instruction is not included in the detected handwriting input.

8. A mobile device, comprising:
   an input unit configured to detect a handwriting input for verifying a user;
   a storage unit configured to store user verification information; and
   a controller configured to extract an input feature of the detected handwriting input, perform a first application for verifying the user based on the detected handwriting input, and, compare the input feature with a pre-stored user verification information input feature, and determine whether the user verification is successful based on a result of the comparison,
   wherein the input feature comprises at least one of an input means, a shape of the detected handwriting input and a speed of the detected handwriting input,
   wherein the controller is further configured to perform one or more processes for maintaining and releasing the lock state while simultaneously performing a second application corresponding to an instruction included in the detected handwriting input which is used for verifying the user,
   wherein the controller is further configured to extract a character from the detected handwriting input, search for the instruction corresponding to the extracted character, and acquire information regarding the second application corresponding to the instruction.

9. The mobile device of claim 8, further comprising:
   a storage unit configured to store user verification information,
   wherein the input unit is further configured to detect a handwriting input for registering the user verification information and the controller is further configured to extract an input feature of the detected handwriting input for registering the user verification information, create the user verification information including the input feature, and store the created user verification information in the storage unit.

10. The mobile device of claim 8, wherein the controller is further configured to calculate a similarity between the input feature of the detected handwriting input and a pre-stored user verification information input feature based on a result of the comparison, and determine that the user verification is successful when the similarity is greater than or equal to a threshold value or that the user verification is unsuccessful when the similarity is less than the threshold value.

11. The mobile device of claim 10, wherein the threshold value is set according to a type of input means, including at least one of a user's hand or a finger, and stylus pen, that caused the input.

12. The mobile device of claim 8, wherein the controller is further configured to maintain a lock state when the user verification is unsuccessful, and release the lock state when the user verification is successful.

13. The mobile device of claim 8, wherein the controller is further configured release a lock state when user verification is successful.

14. The mobile device of claim 8, further comprising:
a display unit which displays information,
wherein the controller is further configured to release a lock state when user verification is successful, and display an idle screen or a screen of a currently executed second application when the instruction is not included in the detected handwriting input.

\* \* \* \* \*